United States Patent [19]
Sewell

[11] Patent Number: 5,944,130
[45] Date of Patent: Aug. 31, 1999

[54] TRUNNION MOUNTED DRIVE TRAIN ARRANGEMENT

[75] Inventor: Andy Sewell, Northunderland, United Kingdom

[73] Assignee: Caterpillar Inc., Peoria, Ill.

[21] Appl. No.: 08/963,861

[22] Filed: Nov. 4, 1997

[51] Int. Cl.⁶ .............................. B60D 7/14; B62D 53/00
[52] U.S. Cl. .......................................... 180/14.4; 180/297
[58] Field of Search .................................. 180/14.4, 291, 180/297, 233, 248, 249, 250

[56] References Cited

U.S. PATENT DOCUMENTS

| | | | |
|---|---|---|---|
| 3,442,345 | 5/1969 | Berger | 180/14.4 |
| 3,773,129 | 11/1973 | Anderson | 180/14.4 |
| 3,811,699 | 5/1974 | Casey | 180/14.4 |
| 4,147,263 | 4/1979 | Frederick et al. | 414/718 |
| 4,805,720 | 2/1989 | Clenet | 180/248 |
| 5,595,398 | 1/1997 | Brown | 280/763.1 |
| 5,618,156 | 4/1997 | Brown | 414/694 |
| 5,687,809 | 11/1997 | Braud | 180/297 |
| 5,836,733 | 11/1998 | Moses et al. | 180/297 |

FOREIGN PATENT DOCUMENTS

| | | |
|---|---|---|
| 2009968 | 8/1991 | Canada . |
| 0577388 | 1/1994 | European Pat. Off. . |
| 517282 | 1/1940 | United Kingdom . |
| 727917 | 4/1955 | United Kingdom . |
| 763437 | 12/1956 | United Kingdom . |
| 2137145 | 10/1964 | United Kingdom . |
| 2081656 | 2/1982 | United Kingdom . |
| 2161784 | 1/1986 | United Kingdom . |
| 2250246 | 3/1992 | United Kingdom . |
| 89/00972 | 2/1989 | WIPO . |
| 95/31615 | 11/1995 | WIPO . |

*Primary Examiner*—J J Swann
*Assistant Examiner*—Lynda Jasmin
*Attorney, Agent, or Firm*—Alan J. Hickman

[57] ABSTRACT

First and second differentials are pivotally connected beneath the frame of a work machine by trunnion supporting members and first and second pairs of trunnions. Output and input shafts extend through bores disposed in the first and second trunnions and are connected to a power transferring shaft by a pair of joints. A distance "L" between a center of universal movement of the joints is minimized. The first differential includes a transfer gear portion.

20 Claims, 5 Drawing Sheets

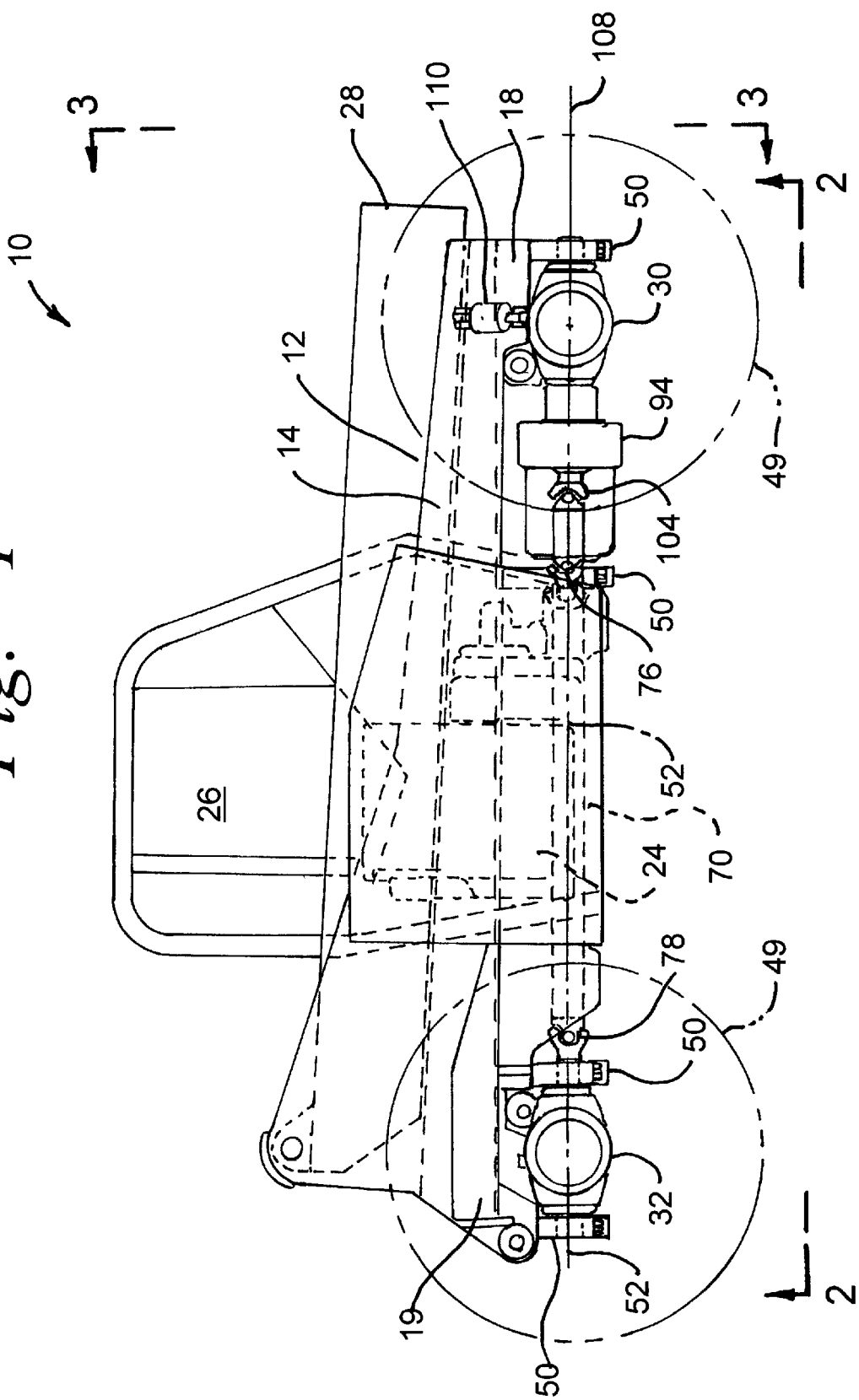

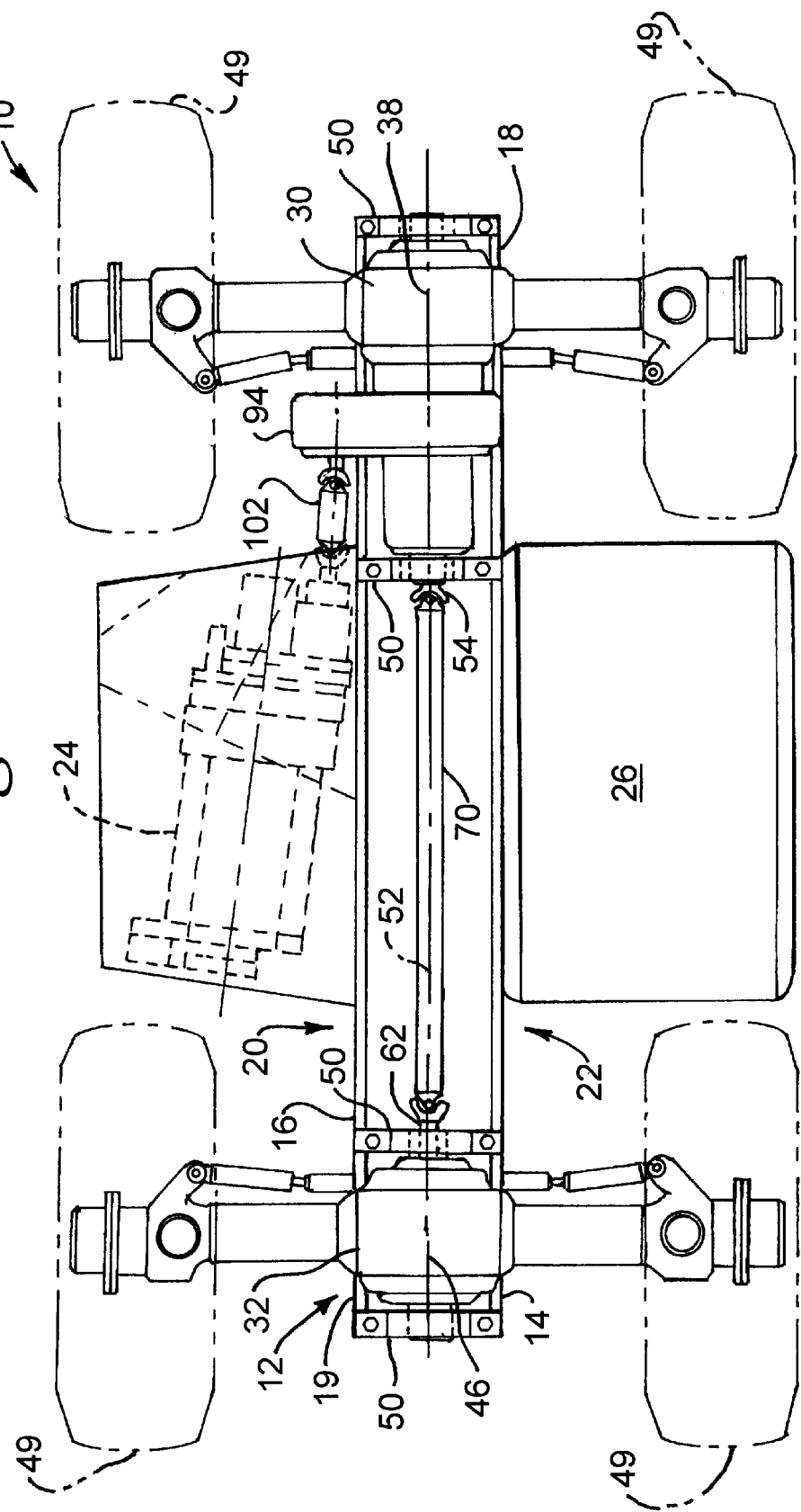

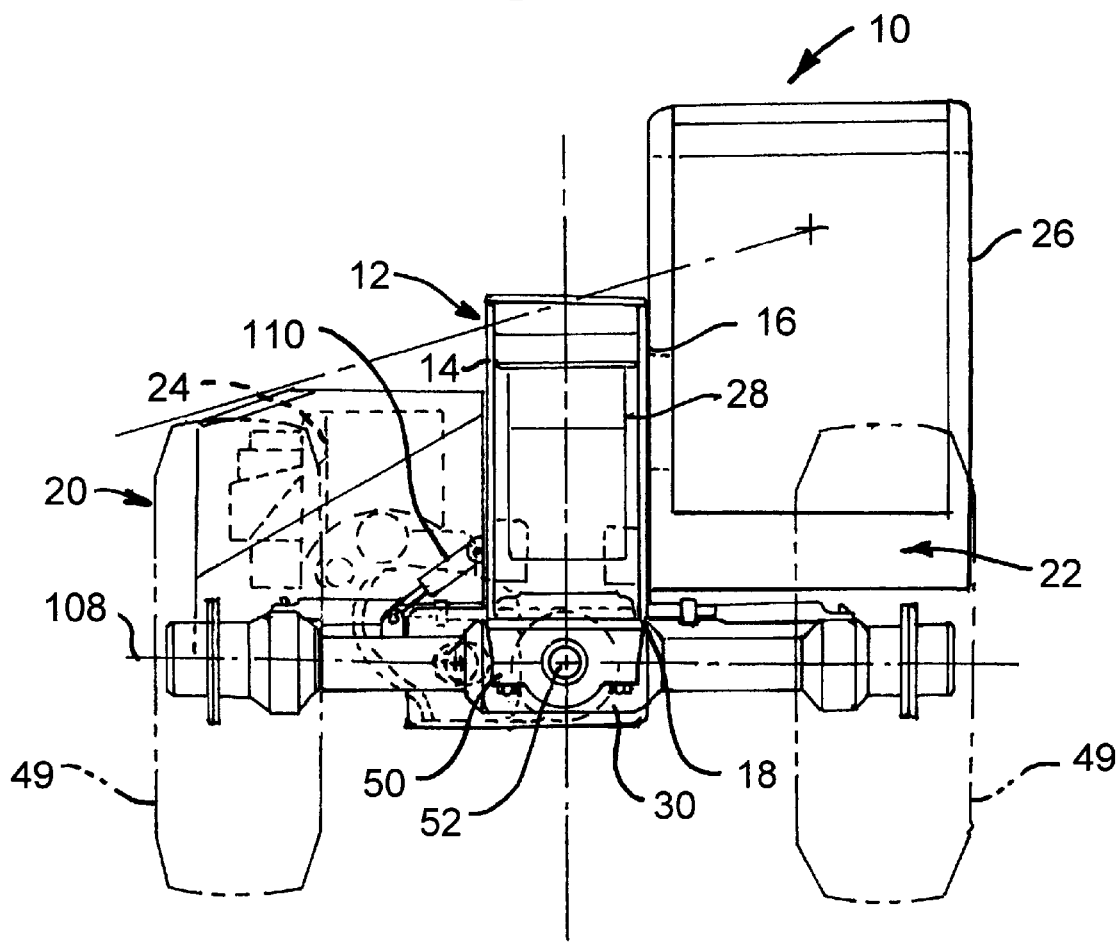
*Fig. - 3 -*

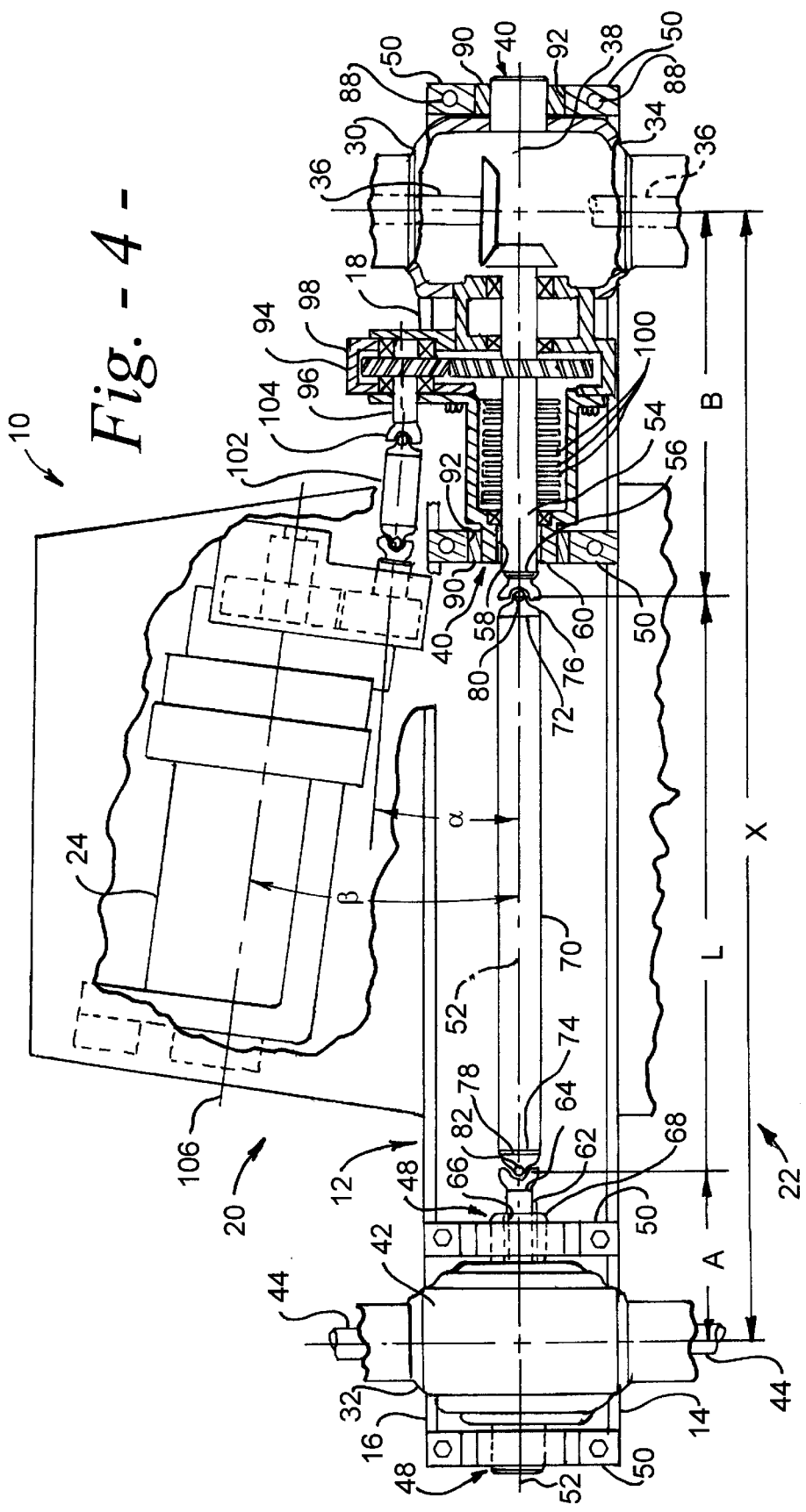
Fig. -4-

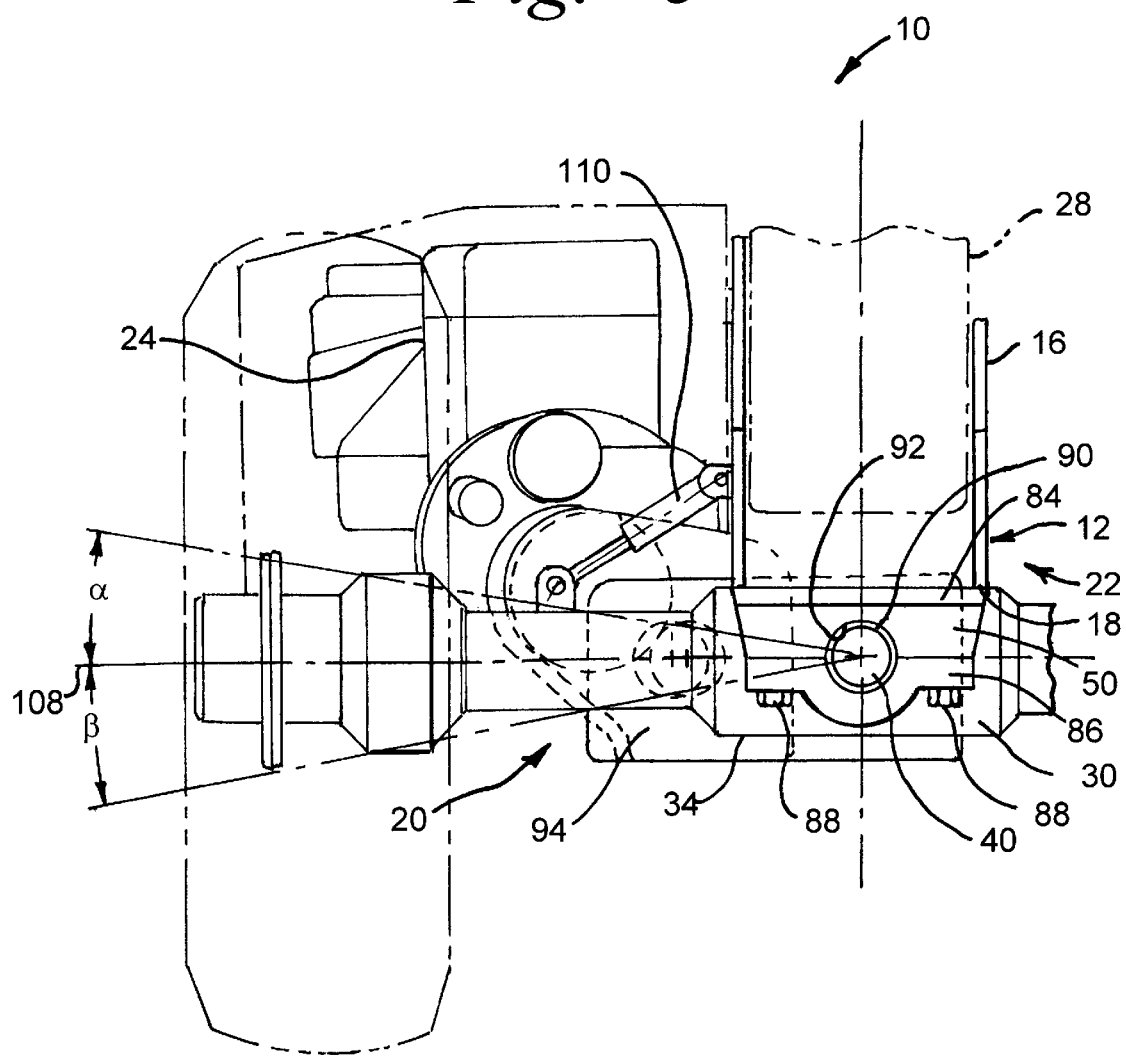
Fig. - 5 -

TRUNNION MOUNTED DRIVE TRAIN ARRANGEMENT

TECHNICAL FIELD

This invention relates to a drive train arrangement and more particularly to a drive train arrangement having first and second trunnion mounted differentials and a power transferring shaft of a predetermined length operatively connected between the first and second differentials.

BACKGROUND ART

It has been a practice to provide trunnion mounted differentials on a work machine in order to provide leveling capabilities for the machine during machine operation. In such applications, the differentials are normally spaced a sufficient distance apart to provide an appropriate wheel base length spacing. Load carrying capacity and machine stability are parameters associated with this spacing. In front and rear wheel drive applications, the distance is often great enough in magnitude to require that the cross-sectional diameter of the power transferring shaft connecting the input and output shafts of the differentials be greater in magnitude than that required to transfer the power. At rotational speeds of normal operation, a shaft capable of handling the torque will deflect excessively, vibrate, and fail prematurely. Increasing the diameter of the shaft causes a wasteful use of material and increases the costs of manufacture.

In some applications the transfer gear box is mounted on the machine vertically. In such applications, and given that a predetermined minimum ground clearance is required, the center of gravity of the machine is elevated and machine stability is sacrificed. This also requires that the engine is at a higher elevation which reduces operator visibility thereover.

In other machine applications, trunnions are used to pivotally connect the differential to the frame. In these applications the trunnions are spaced elevationally above the drive shaft connected between the differentials. This raises the center of gravity of the machine and the elevational position of the engine.

When providing a disc brake on a machine to brake rotation of the drive shaft it is common practice to mount a separate brake assembly on the machine frame. This requires additional shafts, joints and other related components. This increases the complexity and is detrimental to prolonged life.

The present invention is directed to overcoming one or more of the problems set forth above.

DISCLOSURE OF THE INVENTION

A trunnion mounted drive train arrangement for a work machine having a longitudinally extending frame having first and second longitudinally spaced end portions is provided. A first differential has a first housing, a first axle shaft rotatively connected to and extending from the first housing, a first axis transverse the first axle shaft, and a first pair of spaced apart cylindrical trunnions connected to the housing and extending in opposite directions axially along the first axis. A second differential has a second housing, a second axle shaft rotatively connected to and extending from the second housing, a second axis transverse the second axle shaft, and a second pair of spaced apart cylindrical trunnions connected to the housing and extending in opposite directions axially along the second axis. A plurality of trunnion supporting members removably pivotally connects the first and second pairs of trunnions to the frame. The first differential is located at the first end portion of the frame and the second differential is located at the second end portion of the frame. The first and second axles are spaced preselected distance "X" apart. An output shaft having an end is being rotatively connected to the first housing. The output shaft extending axially along the first axis through a bore disposed axially in a trunnion of the first pair. The bore opens toward the second differential. An input shaft having an end is rotatively connected to the second housing. The input shaft extends axially along the second axis through a bore disposed axially in a trunnion of the second pair. The bore in the trunnion of the second pair opens toward the first differential. A power transferring shaft having first and second ends is disposed between the ends of the output and input shafts. A first joint connects the first end of the power transfer shaft to the end of the output shaft and provides universal motion therebetween. A second joint connects the second end of the power transferring shaft to the end of the input shaft and provides universal motion between the power transferring shaft and the input shaft. The first and second joints each have a center of universal pivotal movement. The center of universal pivotal movement of the first and second joints is spaced a predetermined distance "L" apart.

Such a configuration maintains a low work machine center of gravity and facilitates the use of drive shaft having a minimum cross-sectional diameter and requires a minimum number of parts.

BRIEF DESCRIPTION OF THE DRAWINGS

FIG. 1 is a diagrammatic side view of an embodiment of the present invention showing a work machine with the trunnion mounted drive train arrangement;

FIG. 2 is a diagrammatic bottom view of the work machine taken in a direction of lines 2—2 of FIG. 1;

FIG. 3 is a diagrammatic end view taken along lines 3—3 of FIG. 1;

FIG. 4 is a diagrammatic enlarged view of the embodiment of FIG. 2 with portions removed to show the trunnion mounted drive train arrangement in greater detail; and FIG. 5 is a diagrammatic enlarged end view of FIG. 3, with portions removed showing the trunnion mounted drive train in greater detail.

BEST MODE FOR CARRYING OUT THE INVENTION

With reference to the drawings, and particularly FIGS. 1–3, a work machine 10, for example, but not limited to, a telescopic material handler, has a longitudinally extending frame 12 consisting of first and second elongated spaced side members 14,16 connected by an interconnecting support structure to maintain the side members 14,16 substantially parallel. The frame 12 has first and second longitudinally spaced end portions 18,19 adjacent opposite ends thereof. The machine 10 has first and second opposite sides 20,22 adjacent the first and second frame sides, respectively. A prime mover 24, for example an engine 24, is connected to the frame and located to the first side 20 of the frame 12. An operator's station 26 is located to the second side 22 and connected to the machine frame 12. A boom 28 is pivotally connected to the second end portion 19 of the frame and pivotally movable relative to the frame 12 between a lowered position at which the boom is nested between the first and second side members 14,16 and a second position elevationally spaced from being nested between the first and second side members 14,16.

A first differential 30 is pivotally connected to the first end portion 18 of the frame 12 and a second differential 32 is pivotally connected to the second end portion 19 of the frame 12. The pivotal locations of the first and second differentials 30,32 are located elevationally beneath the frame 12. This will be discussed subsequently in greater detail.

As best seen in FIGS. 4 and 5, the first differential 30 has a first housing 34, a first axle shaft 36 rotatively connected to and extending from the first housing 34, a first axis 38 transverse the first axle shaft 36, and a first pair of spaced apart cylindrical trunnions 40 connected to said housing 34 and extending in opposite directions axially along said first axis 38.

The second differential 32 has a second housing 42, a second axle shaft 44 rotatively connected to and extending from the second housing 42, a second axis 46 transverse the second axle shaft 44, and a second pair of spaced apart cylindrical trunnions 48 connected to the second housing 42 and extending in opposite directions axially along the second axis 46. As best seen in FIGS. 1–3, ground engaging wheels 49 are connected to the first and second axle shafts 36,44 and rotatable therewith for moving the work machine 10 over the underlying terrain.

Trunnion supporting members 50 removably pivotally connect the first and second pairs of trunnions 40,48 to the frame 12. The first pair of trunnions 40 are pivotally connected to the first end portion 18 of the frame 12 and the second pair of trunnions 48 are pivotally connected to the second end portion 19 of the frame 12.

The first and second axle shafts 36,44 are positioned a preselected distance "X" apart. This distance is determined based on well known wheel base engineering principles, the particular type of work machine, the load capacity of the work machine and machine stability factors, to name just a few.

The axle shafts 36,44 are oriented transverse to the longitudinal extension of the machine frame 12 and maintained substantially perpendicular to a longitudinal axis 52 of the frame 12 by the trunnion supporting members 50. The plurality of trunnion supporting members 50 removably pivotally connect the first and second pairs of cylindrical trunnions 40,48 to the frame 12 at a location elevationally beneath the frame 12.

As best seen in FIG. 4, an output shaft 54 having an end 56 is rotatively connected to the first housing 34. The output shaft 54 is provided to deliver rotary power from the first differential 30 to the second differential 32. Rotary power is delivered from the engine 24 to the first differential 30 in a manner to be discussed later. The output shaft 54 extends axially along the first axis 38 through a bore 58 disposed axially in a trunnion 60 of the first pair 40. The bore 58 is preferably concentric about and along the first axis 38 and opens toward the second differential 32.

An input shaft 62 having an end 64 is rotatively connected to the second housing 42. The input shaft 62 is provided to receive rotary power from the first differential 30 by way of the output shaft 54. The input shaft 62 rotates the second axle shaft 44 by way of a differential gear set of conventional design. The input shaft 62 extends axially along the second axis 46 and through a bore 66 disposed axially in a trunnion 68 of the second pair of cylindrical trunnions 48. The bore 66 is preferably concentric about the second axis 46 and opens toward the first differential 32.

A power transferring shaft 70 of cylindrical construction has first and second end opposite ends 72,74 and is disposed between the ends 56,64 of the output and input shafts 54,62.

A first joint 76 connects the first end 72 of the power transferring shaft 70 to the end 56 of the output shaft 54. The first joint 76 provides for universal motion of the power transferring shaft 70 relative to the output shaft 54. The first joint 76 includes either universal or constant velocity type joints of well known design. Connection of the first joint to the ends 72 and 56 may be achieved in any suitable manner, for example, by welding.

A second joint 78 connects the second end 74 of the power transferring shaft 70 to the end 64 of the input shaft 62. The second joint 78 provides for universal motion between the power transferring shaft 70 and the input shaft 62. The second joint 78 includes either universal or constant velocity type joints of well known design. Connection of the second joint 78 to the ends 74 and 64 may be achieved in any suitable manner, for example, by welding.

The first and second joints 76,78 have a respective center of universal pivotal movement 80,82. The center of universal pivotal movement 80 of the first joint 76 is spaced a predetermined distance "L" from the center of universal pivotal movement 82 of the second joint 78. The predetermined distance "L" has a range within a magnitude of between 60 percent and 80 percent the distance "X". Because this distance is reduced over other conventional designs, the cross-sectional diameter of the power transferring shaft 70 is of a size sufficient to transmit the desired amount of power between the first and second differentials 30,32. The cross-sectional diameter is however not sufficient to accommodate any additional forces on the shaft caused by centrifugal motion as is typical in conventional design. Therefore, the diameter of the shaft is reduced substantially over prior designs.

The center of universal pivotal movement 80 of the first joint 76 is a preselected distance "B" from the first axle shaft 36 of the first differential 30 and the center of universal pivotal movement 82 of the second joint 78 is a preselected distance "A" from the second axle shaft 44 of the second differential 32. The distance "A" is smaller in magnitude than distance "B". To achieve the shorter spacing "L", the distance "B" is within a range of 20 to 27 percent the magnitude of distance "X". Preferably, the distance "B" is nominally about 21 percent the magnitude of distance "X".

As best seen in FIGS. 4 and 5, the plurality of trunnion supporting members 50 each have a first trunnion supporting portion 84 connected to the frame by welding and a second trunnion supporting portion 86 connected to the first supporting portion by a plurality of threaded fasteners 88. A sleeve bearing 90 is disposed about each of the cylindrical trunnions of the first and second pairs 40,48 and disposed in a bore 92.

As best seen in FIG. 4, the first differential 30 has transfer gear portion 94. The transfer gear portion 94 has a rotatable input shaft 96 which is adapted to deliver rotary power from the engine 24 to the output shaft 54 of the first differential 30. The input shaft 96 is offset from and substantially parallel to the output shaft 54 of the first differential 30. The transfer gear portion 94 includes a transfer housing portion 98. The transfer housing portion 98 supporting the input shaft 96 for rotation relative thereto. The transfer housing portion 98 is either an integral part of the first housing 34 or removably connected to the first housing 34. The first housing portion 34 is preferably a casting. The transfer housing portion 98 has the trunnion 60 of the first pair 40 of cylindrical trunnions connected thereto.

A plurality of discs 100 is disposed in the transfer housing portion 98 and about the output shaft 54 of the first differential 30. The discs 100 are axially stacked and alternately operatively connected to the output shaft 54 and the transfer housing portion 98. As shown, the discs 100 are used to provide machine braking. Alternatively or in addition, discs 100 may be included to provide a drive disconnect between the first and second differentials 30, 32. It should be recognized that the transfer housing portion 98 may also house a third differential gear set, such as required when different wheel diameters are employed. Since the above options are well known in the art, additional discussion will be omitted.

The engine 24 has a drive shaft 102 connected thereto and to the input shaft 96 of the transfer gear portion 94 of the first differential 30. A third joint 104 is provided for connecting the drive shaft 102 to the input shaft 96 and providing universal pivotal movement between the input shaft 96 of the first differential 30 and the engine drive shaft 102. The engine drive shaft 102 is at a predetermined angle "'"" of about 4 degrees (a range of between 3.5 degrees and 4.5 degrees) relative to the power transferring shaft 70 in order to provide working movement of the third joint 104 and adequate joint life. This angle also enables the engine 24 to be suitably positioned.

Since the drive shaft 102 is substantially longitudinally located between the transfer housing portion 98 and the trunnion supporting member 50 adjacent the trunnion 60 of the first pair of trunnions 40, the drive shaft 102 may be positioned closer to the output shaft 54 than otherwise possible. This tucking of the drive shaft therebetween enables the use of smaller transfer gears and reduces the size of the transfer gear portion 94 and transfer housing portion.

The engine 24 has a longitudinal engine axis defined by conventional main journal crank shaft bearings (not shown). The longitudinal engine axis 106 is at a angle "$" of nominally of about 8 degrees (between 7 degrees and 9 degrees) relative to the power transferring shaft 70. This provides clearance between the engine 24 and the frame 12 and provides for adequate joint working movement.

The power transferring shaft 70, the input shafts 62,96 and the output shaft 54 substantially axially lie in a plane 108 passing transversely through the longitudinal frame 12. The longitudinal frame axis 52 lies in the plane 108. It is to recognized that the input shaft 62 may be displaced somewhat out of the plane 108 in order to keep a small angle on the joints 80,82 for proper lubrication purposes or to accommodate different wheel diameters at the first and second end portions 18,19 of the machine 10. For the purpose of this invention, this displacement is considered within the plane 108.

Referring to FIGS. 1,3, and 5, a jack 110 is pivotally connected at opposite ends thereof between the frame 12 and the first housing 34 of the first differential 30. The jack 110 is extensibly movable to pivot said first differential about the first pair of trunnions. This pivotal movement is provided in order to provide machine 10 leveling. It should be noted that a jack 110 may be also be provided to pivot the second differential 32 about the second pair of trunnions 48 in the same manner.

INDUSTRIAL APPLICABILITY

With reference to the drawings, and in operation, the work machine 10 is propelled over the underlying terrain by the engine 24 by way of the plurality of wheels 49 connected to the first and second axle shafts 36,44 of the first and second trunnion mounted differentials 32,34. Having the first and second pairs of trunnions 40,48 and the input and output shafts 54,62 substantially along a common longitudinal frame axis 52 facilitates simplicity of construction, a reduction in the number of pivot and rotation points changing location during pivotal movement, and a more compact design. Also, having the common axis 52 facilitates a lowering of the frame 12, the engine 24 and the center of gravity of the machine 10.

The power transferring shaft 70 rotates in response to rotation of the drive shaft 102 and the second axle shaft 44 rotates in response to rotation of the drive shaft. Since the length of the power transferring shaft 70 has been minimized (the distance "L" between the centers of pivotal movement 80,82), the cross-sectional diameter of the power transferring shaft 70 is resultantly substantially smaller.

As earlier indicated, this reduction in the length of the power transferring shaft 70 is attributed to a lengthening of the first housing 34 of the first differential 30. The inclusion of the transfer gear portion 94, and the optional addition of the discs 100 (brake or clutch) and/or a third differential gear set further enhances and improves the space relations and the compactness of the design.

The transfer gear portion 94, and particularly the input shaft 96 being radially located (offset) from the first axis 38, changes the relative location of the input shaft 96 and the engine 24 when the first differential pivots about the first pair of trunnions 40. The slight change in distance between the engine 24 and the input shaft 96 is accommodated by a slidable spline connection (not shown) between the input shaft 96 and the drive shaft 102.

The relative percentage lengths "A", "B", and "L" as set forth above with respect to the distance "X" between the first and second axle shafts 36,44 provides the optimum distance relationship and facilitates a minimum power transferring shaft diameter for a given shaft speed and torque.

Other aspects, objects and advantages of this invention can be obtained from a study of the drawings, the disclosure and the appended claims.

I claim:

1. A trunnion mounted drive train arrangement for a work machine having a longitudinally extending frame, said frame having first and second longitudinally spaced end portions, comprising:

a first differential having a first housing, a first axle shaft rotatively connected to and extending from the first housing, a first axis transverse the first axle shaft, and a first pair of spaced apart cylindrical trunnions connected to said housing and extending in opposite directions axially along said first axis;

a second differential having a second housing, a second axle shaft rotatively connected to and extending from the second housing, a second axis transverse the second axle shaft, and a second pair of spaced apart cylindrical trunnions connected to said housing and extending in opposite directions axially along said second axis;

a plurality of trunnion supporting members removably pivotally connecting the first and second pairs of trunnions to the frame, said first differential being located at the first end portion of the frame and said second differential being located at the second end portion of the frame, said first and second axles being a preselected distance "X" apart;

an output shaft having an end and being rotatively connected to the first housing, said output shaft extending axially along said first axis through a bore disposed axially in a trunnion of the first pair, said bore opening toward the second differential;

an input shaft having an end and being rotatively connected to the second housing, said input shaft extending axially along said second axis through a bore disposed axially in a trunnion of the second pair, said bore in the trunnion of the second pair opening toward the first differential;

a power transferring shaft having first and second ends and being disposed between the ends of the output and input shafts;

a first joint connecting the first end of the power transfer shaft to the end of the output shaft and providing universal motion therebetween;

a second joint connecting the second end of the power transferring shaft to the end of the input shaft and providing universal motion between the power transferring shaft and the input shaft, said first and second joints each having a center of universal pivotal movement, said center of universal pivotal movement of the first and second joints being spaced a predetermined distance "L" apart, said predetermined distance "L" having a range of between 60 percent and 80 percent the distance "X".

2. The trunnion mounted drive train arrangement, as set forth in claim 1, wherein the center of universal pivotal movement of the first joint is a preselected distance "B" from the axle shaft of the first differential and the center of universal pivotal movement of the second joint is a preselected distance "A" from the axle shaft of the second differential, said distance "A" being smaller in magnitude than distance "B".

3. The trunnion mounted drive train arrangement, as set forth in claim 2, wherein distance "B" being within a range of 20 to 27 percent the magnitude of distance "X".

4. The trunnion mounted drive train arrangement, as set forth in claim 3, wherein the distance "B" is nominally about 21 percent the magnitude of distance "X".

5. The trunnion mounted drive train arrangement, as set forth in claim 3, wherein said frame has a longitudinal axis and wherein said plurality of trunnion supporting members removably pivotally connecting the first and second pairs of trunnions to the frame at a location elevationally beneath the frame and maintaining the first and second axes elevationally beneath the frame and substantially perpendicular to the longitudinal axis of the frame.

6. The trunnion mounted drive train arrangement, as set forth in claim 5, wherein said plurality of trunnion supporting members each having a first trunnion supporting portion connected to the frame by welding and a second trunnion supporting portion connected to the first supporting portion by a plurality of threaded fasteners.

7. The trunnion mounted drive train arrangement, as set forth in claim 5, wherein said trunnion supporting members each including a sleeve bearing disposed about said cylindrical trunnion and connected to the second trunnion supporting portion.

8. The trunnion mounted drive train arrangement for a work machine having a longitudinally extending frame and an engine, said frame having first and second longitudinally spaced end portions, comprising:

a first differential having a first housing, a first axle shaft rotatively connected to and extending from the first housing, and a first axis transverse the first axle shaft, and a first pair of spaced apart cylindrical trunnions connected to said housing and extending in opposite directions axially along said first axis;

a second differential having a second housing, a second axle shaft rotatively connected to and extending from the second housing, a second axis transverse the second axle shaft, and a second pair of spaced apart cylindrical trunnions connected to said housing and extending in opposite directions axially along said second axis;

a plurality of trunnion supporting members removably pivotally connecting the first and second pairs of trunnions to the frame, said first differential being located at first end portion of the frame and said second differential being located ate the second end portion of the frame, said first and second axles being a preselected distance "X" apart;

an output shaft having an end and being rotatively connected to the first housing, said output shaft extending axially along said first axis through a bore disposed axially in a trunnion of the first pair, said bore opening toward the second differential;

an input shaft having an end and being rotatively connected to the second housing, said input shaft extending axially along said second axis through a bore disposed axially in trunnion of the second pair, said bore in the trunnion of the second pair opening toward the first differential;

a power transferring shaft having first and second ends and being disposed between the ends of the output and input shafts;

a first joint connecting the first end of the power transfer shaft to the end of the output shaft and providing universal motion therebetween, said center of universal pivotal movement of the first joint a preselected distance "B" from the axle shaft of the first differential;

a second joint connection the second end of the power transferring shaft to the end of the input shaft and providing universal motion between the power transferring shaft and the input shaft, said center of universal pivotal movement of the second joint is a preselected distance "A" from the axle shaft of the second differential, said distance "A" being smaller in magnitude than distance "B" being within a range of 20 to 27 percent the magnitude of distance "X", said first and second joints each having a center of universal pivotal movement, said center of universal pivotal movement of the first and second joints being spaced a predetermined distance "L" apart, said predetermined distance "L" having a range of between 60 percent and 80 percent the distance "X", said first differential having a transfer gear portion, said transfer gear portion having a rotatable input shaft adapted to deliver rotary power from the engine to the output shaft of the first differential, said input shaft of the transfer gear portion being offset from and substantially parallel to the output shaft of the first differential.

9. The trunnion mounted drive train arrangement, as set forth in claim 8, wherein said frame has first and second sides and said engine being mounted on the frame and to the first side of the frame, said engine having a drive shaft and said engine drive shaft being connected to the input shaft of the first differential by a third joint, said third joint providing universal pivotal movement between the input shaft of the first differential and the engine drive shaft.

10. The trunnion mounted drive train arrangement, as set forth in claim 9, wherein said engine drive shaft being at a predetermined angle """ having a magnitude of between 3.5 degrees and 4.5 degrees relative to the power transferring shaft.

11. The trunnion mounted drive train arrangement, as set forth in claim 10, wherein said engine having a longitudinal engine axis and said longitudinal engine axis being at a angle "$" having a magnitude of between 7 degrees and 9 degrees relative to the power transferring shaft.

12. The trunnion mounted drive train arrangement, as set forth in claim 9, wherein said transfer gear portion having a transfer housing portion, said transfer housing portion being an integral part of the first differential housing, said transfer housing portion having a cylindrical trunnion of the first pair of cylindrical trunnions connected thereto.

13. The trunnion mounted drive train arrangement, as set forth in claim 10, including a plane transverse the longitudinal frame, said power transferring shaft, said input shafts and said output shaft substantially axially lying in said plane.

14. The trunnion mounted drive train arrangement, as set forth in claim 13, including an operators station mounted to the frame and being located to the second side of the frame.

15. The trunnion mounted drive train arrangement, as set forth in claim 9, wherein said transfer gear portion having a housing portion removably connected to the first differential, said transfer housing portion having a cylindrical trunnion of the first pair of cylindrical trunnions connected thereto.

16. The trunnion mounted drive train arrangement as set forth in claim 15, including a plurality of discs disposed in the transfer housing portion and about the output shaft of the first differential.

17. The trunnion mounted drive train arrangement, as set forth in claim 12, including a plurality of brake discs disposed in the transfer housing portion and about the output shaft of the first differential.

18. The trunnion mounted drive train arrangement, as set forth in claim 9, including a jack connected between the frame and said first differential, said jack being extensibly movable to pivot said first differential about the first pair of trunnions.

19. The trunnion mounted drive train arrangement, as set forth in claim 12, wherein said drive shaft being substantially longitudinally located between the transfer housing portion and the cylindrical trunnion of the first pair of cylindrical trunnions.

20. A trunnion mounted drive train arrangement for a work machine having a longitudinally extending frame, said frame having first and second longitudinally spaced end portions, comprising:

a first differential having a first housing, a first axle shaft rotatively connected to and extending from the first housing, a first axis transverse the first axle shaft, and a first pair of spaced apart cylindrical trunnions connected to said housing and extending in opposite directions axially along said first axis;

a second differential having a second housing, a second axle shaft rotatively connected to and extending from the second housing, a second axis transverse the second axle shaft, and a second pair of spaced apart cylindrical trunnions connected to said housing and extending in opposite directions axially along said second axis;

a plurality of trunnion supporting members removably pivotally connecting the first and second pairs of trunnions to the frame, said first differential being located at the first end portion of the frame and said second differential being located at the second end portion of the frame, said first and second axles being a preselected distance "X" apart;

an output shaft having an end and being rotatively connected to the first housing, said output shaft extending axially along said first axis through a bore disposed axially in a trunnion of the first pair, said bore opening toward the second differential;

an input shaft having an end and being rotatively connected to the second housing, said input shaft extending axially along said second axis through a bore disposed axially in a trunnion of the second pair, said bore in the trunnion of the second pair opening toward the first differential;

a power transferring shaft having first and second opposite ends and being disposed between and universally pivotally connected at the first end to the output shaft and at the second end to the input shaft.

* * * * *